(12) United States Patent
Kriese

(10) Patent No.: US 12,007,072 B2
(45) Date of Patent: Jun. 11, 2024

(54) PROTECTIVE DEVICE FOR PRESSURIZED GAS CONTAINERS

(71) Applicant: MESSER GASPACK GMBH, Krefeld (DE)

(72) Inventor: Alexander Kriese, Baden bei Wien (AT)

(73) Assignee: MESSER GASPACK GMBH, Krefeld (DE)

( * ) Notice: Subject to any disclaimer, the term of this patent is extended or adjusted under 35 U.S.C. 154(b) by 369 days.

(21) Appl. No.: 17/429,813

(22) PCT Filed: Feb. 5, 2020

(86) PCT No.: PCT/EP2020/052908
§ 371 (c)(1),
(2) Date: Aug. 10, 2021

(87) PCT Pub. No.: WO2020/165006
PCT Pub. Date: Aug. 20, 2020

(65) Prior Publication Data
US 2022/0128198 A1   Apr. 28, 2022

(30) Foreign Application Priority Data

Feb. 15, 2019  (DE) ..................... 10 2019 001 148.1

(51) Int. Cl.
*F17C 13/06* (2006.01)
*F17C 13/04* (2006.01)

(52) U.S. Cl.
CPC .............. *F17C 13/06* (2013.01); *F17C 13/04* (2013.01); *F17C 2201/0109* (2013.01);
(Continued)

(58) Field of Classification Search
CPC .. F17C 13/06; F17C 13/04; F17C 2201/0109; F17C 2205/0308; F17C 2205/0394;
(Continued)

(56) References Cited

U.S. PATENT DOCUMENTS 3,776,412 A   12/1973  Mink
4,332,331 A    6/1982  Fawley
(Continued)

FOREIGN PATENT DOCUMENTS

DE    4440298 A1    5/1996
EP    0629812 A1   12/1994
(Continued)

OTHER PUBLICATIONS

International Search Report issued in corresponding PCT Application No. PCT/EP2020/052908, dated May 12, 2020.
(Continued)

*Primary Examiner* — Shawn M Braden
(74) *Attorney, Agent, or Firm* — Andrus Intellectual Property Law, LLP

(57) ABSTRACT

Protective devices for pressurized gas cylinders have a housing which is arranged around an inner cavity intended for receiving an extraction valve and which has access openings for the extraction connection and for further fittings. In order to counteract soiling or contamination of the extraction connection, the invention provides for an elastically deformable safety element to be fastened to the housing in the region of the access opening of the extraction connection, said element being able to be swung out from a closed position, in which the extraction connection is completely covered and/or enclosed by the safety element, into a position in which it frees the extraction connection.

9 Claims, 2 Drawing Sheets

(52) U.S. Cl.
CPC .............................. *F17C 2201/058* (2013.01);
*F17C 2205/0308* (2013.01); *F17C 2205/0394* (2013.01); *F17C 2223/0123* (2013.01)

(58) Field of Classification Search
CPC ...... F17C 2223/0123; F17C 2201/0119; F17C 2201/032; F17C 2203/0617; F17C 2203/0636; F17C 2205/0165; F17C 2221/011; F17C 2221/013; F17C 2221/014; F17C 2223/035; F17C 2250/043; F17C 2250/0491; F17C 2260/056; F17C 2270/02; F17C 2270/05; F17C 13/002; Y02E 60/03
See application file for complete search history.

(56) References Cited

U.S. PATENT DOCUMENTS

| | | | | |
|---|---|---|---|---|
| 4,648,526 A | * | 3/1987 | Wood, Jr. ................ | F17C 13/06 137/382 |
| 4,651,888 A | * | 3/1987 | Wood, Jr. ................ | F17C 13/06 137/382 |
| 2007/0119984 A1 | * | 5/2007 | Woods ................ | B65D 83/303 239/338 |
| 2014/0332544 A1 | | 11/2014 | Nolan et al. | |

FOREIGN PATENT DOCUMENTS

| | | |
|---|---|---|
| EP | 0939875 A1 | 9/1999 |
| EP | 0725247 B1 | 10/1999 |
| EP | 3114076 A1 | 1/2017 |
| FR | 3056281 A1 | 3/2018 |
| WO | WO 1991004197 A1 | 4/1991 |
| WO | WO 1998023895 A1 | 6/1998 |
| WO | WO 2015132506 A | 9/2015 |

OTHER PUBLICATIONS

Written Opinion issued in corresponding PCT Application No. PCT/EP2020/052908, dated May 12, 2020.

* cited by examiner

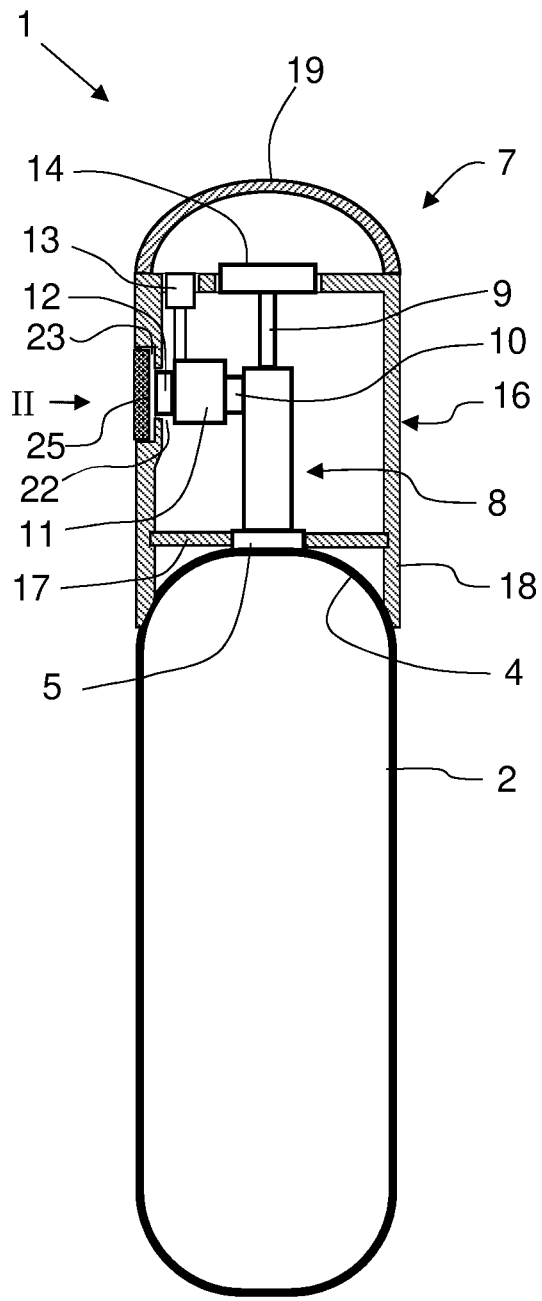
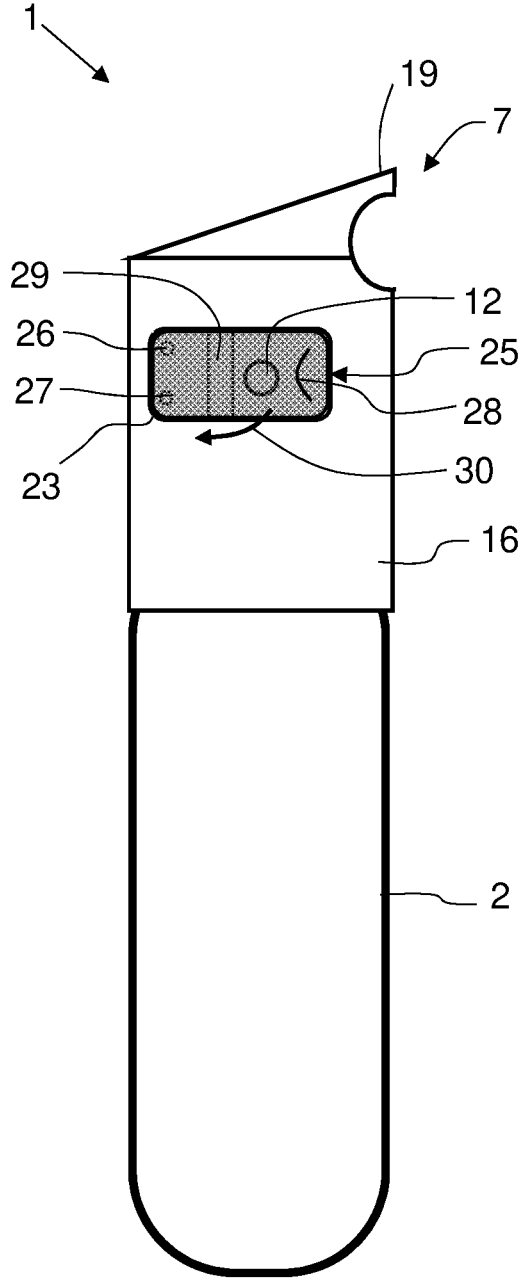
Fig. 1
Fig. 2

PROTECTIVE DEVICE FOR PRESSURIZED GAS CONTAINERS

CROSS-REFERENCE TO RELATED APPLICATIONS

This application is the U.S. national stage application of International Application No. PCT/EP2020/052908, filed Feb. 5, 2020, which International Application was published on Aug. 20, 2020, as International Publication WO 2020/165006 in the German language. The International Application claims priority to German Application No. 10 2019 001 148.1, filed Feb. 15, 2019. The International Application and German Application are hereby incorporated herein by reference, in their entireties.

FIELD

The invention relates to a protective device for pressurized gas containers, having a housing which can be connected to a pressurized gas container and comprises a cavity for enclosing an extraction valve having at least one extraction connection for connection of a consumer device and which has one or more access opening(s) allowing access to the at least one extraction connection.

BACKGROUND

Pressurized gas containers are to be understood hereinbelow as being containers for the storage and transportation of gases under pressure, in particular containers having a capacity of between 1 liter and 200 liters, in particular metallic pressurized gas cylinders, gas cartridges, pressurized dispensers or cryogenic storage containers in which a liquefied gas is stored under pressure. Such pressurized gas containers have a storage volume and an extraction opening at which there is arranged an extraction valve for the controlled removal of gas and for filling the pressurized gas container. The term "extraction valve" is here understood as meaning the extraction valve including all fittings optionally integrated therein, such as, for example, pressure reducers, metering and needle valves, filling connection, extraction connections or the like. In order to protect the extraction valve from damage in the event of falling or the like, valve protective devices in the form of protective covers, hoop guards or protective caps are used, which protective devices are fastened, for example, to an existing thread on the neck ring of a pressurized gas cylinder or to a corresponding fastening portion of the extraction valve. These protective devices have high rigidity so that, if a force acts on the protective device from outside, for example if the container falls over, the energy to be absorbed is dissipated to the body of the pressurized gas container and the extraction valve is thus protected from damage. Such protective devices, which are manufactured from metal and/or plastics material, are described, for example, in publications DE 44 40 298 A1, U.S. Pat. No. 3,776,412 A, WO 91/04197 A1, WO 98/23895 A1, EP 0 725 247 B1, EP 0 629 812 A1, EP 0 939 875 A1 or U.S. Pat. No. 4,332,331 A1.

Increasingly higher demands in terms of hygiene are being made of the packaging means for pressurized gases. This concerns in particular pressurized gas containers which are intended for storing medical gases or gases for the food industry. The background to the requirements are concerns that contaminants may reach unprotected connections in the course of the transport chain and during filling, which contaminants, during later use, may come into contact with the removed gas and contaminate it.

Contamination of extraction connections can additionally take place with the user of the gas, for example if a pressurized gas container is being used in a hospital or in a food-processing plant in areas in which there are potential contaminants, such as, for example, microbes from the surrounding air or potentially contaminated fluids, such as, for example, blood. In this case, at least when no consumer device is connected, contaminants may reach the surfaces of the outwardly open extraction connection and thus result in contamination of the gas on subsequent use. Such contaminants can at present be dealt with only by thorough manual cleaning of the extraction valve before each use, which is very time-consuming when carried out with the necessary care.

In order to protect extraction connections from contaminants or damage, they are sometimes equipped with a protective cap of metal or plastics material, which can also be configured as a tamper-evident label. A protective cap designed specifically for the extraction connections of pressurized gas cylinders is described, for example, in EP 3 114 076 A1. However, the protective cap is in many cases not fastened to the extraction connection again after use or, owing to its construction, it can no longer be fitted to the extraction connection once the tamper-evident seal has been lost.

SUMMARY

The object of the present invention is to provide a protective device for pressurized gas containers which reliably reduces the risk of contamination of the extraction connection and at the same time permits simple handling of the extraction connection.

This object is achieved in a protective device for pressurized gas containers of the type and intended purpose mentioned at the beginning in that the housing is equipped in the region of the access opening of the at least one extraction connection with a resilient safety element which is fastened to the housing in such a manner that it can be opened from a closing position, in which the at least one extraction connection is completely covered by the safety element and/or enclosed thereby, into a freeing position, in which the at least one extraction connection is freed for connection of a consumer device, and which, after the consumer device has been removed from the extraction connection, automatically returns to its closing position.

According to the invention, a pressurized gas container is equipped with an extraction valve and a protective device which shields the extraction valve from mechanical effects. The extraction valve preferably comprises, in addition to one or more extraction connections, further fittings, such as, for example, a pressure reducer or a pressure indicator, and also devices for actuating the valve, such as, for example, a handwheel. In particular, the extraction valve can be a VIPR (valve with integrated pressure regulator). Preferably, the extraction valve is integrated into the housing of the protective device and the access openings of the housing are adapted to the fittings of the extraction valve.

The housing is composed, for example, of two half-shells which are screwed together and form overall a housing that is closed apart from the access openings and a fastening portion. The fastening portion serves to connect the housing to the pressurized gas container and comprises, for example, an internal thread for screwing to a conventional neck thread of a pressurized gas cylinder. The access openings are preferably in such a form that, in the mounted state, the fittings of the extraction valve are surrounded by the respective access openings with an exact fit, whereby the ingress of contaminants into the interior of the housing is prevented.

According to the invention, the extraction valve is protected by the safety element at least when not in use, that is to say when no consumer device, such as, for example, the gas connection of a consumer or a gas line, is connected to the extraction connection. In this closing position, the safety element fastened to the housing lies on the extraction connection or surrounds it, but without being fixedly connected thereto. Before a consumer device is connected, the safety element is opened into its freeing position. The continuing fastening of the safety element to the housing prevents the safety element from being lost due to inattention of the user on connection of the consumer device.

According to the invention, the safety element can moreover also secure, that is to say cover in the closing state, a plurality of extraction connections simultaneously; where extraction connections are spatially spaced apart from one another, the safety element can also be fastened to the housing between the extraction connections and can be capable of being opened towards both extraction connections. If the protective portion is equipped with a plurality of access openings, each of which permits access to one or more extraction connections of the extraction valve, it is, however, also possible for individual or all the access openings each to be equipped with its own safety element.

Before a consumer device is connected, the safety element is opened and the consumer device is then fastened to the extraction connection. The consumer device connected to the extraction connection then holds the safety element in its freeing position. After removal of the consumer device, the safety element automatically assumes its previous form and position and covers or encloses the extraction connection again.

For this purpose, the safety element is preferably manufactured from a resiliently deformable material, such as elastomer. Elastomers are wide-meshed polymer networks which bend with the application of only a small force and, when the application of force ceases, assume their original form again. Opening of the safety element is thus effected in this case by corresponding bending of the elastomer material.

In an alternative embodiment, the safety element can have a two-part construction and has, in addition to a safety portion which is preferably fastened at a hinge and can also be manufactured from an inflexible material, an automatically acting return mechanism, which is, for example, a return spring. In its closing position, the safety portion covers or encloses the extraction connection and is opened into its freeing position against the action of the return spring. On cessation of the force that brings or holds the safety portion into/in its freeing position, the return spring automatically brings the safety portion back into its closing position.

In order to facilitate handling of the safety element, an advantageous embodiment of the invention provides that the safety element has a defined bending region. The term "bending region" is here to be generally understood as meaning that it comprises, for example, an area of weakness in the material, a portion of lower strength or a solid joint and is so configured that the safety element opens in precisely that region on application of a suitable force and thus allows the extraction connection to be freed. In particular in the case of a safety element made of a resilient material, the bending region is so configured that, when the application of force ceases, the safety element returns automatically to its closing position.

An additional improvement in handling is achieved by equipping the safety element with a grip element. The grip element is, for example, a molded-on hand grip or a grip recess or finger recess which defines for a user the direction in which the force must be exerted in order to bring the safety element into the freeing position.

An embodiment of the invention which is likewise advantageous provides that the safety element is manufactured from a transparent material. In particular, the material is a transparent elastomer.

In order to achieve good shielding of the extraction connection from the surroundings and in order to protect the safety element itself, the housing preferably has in the region of the access opening for the extraction connection or the extraction connections a depression or indentation, the area and depth of which are adapted to the area and depth of the safety element and in which the safety element is received in its closing position.

The pressurized gas containers in which the protective device according to the invention is used are preferably receptacles having a capacity of between 1 liter and 200 liters, preferably between 1 liter and 50 liters. In particular, they are pressurized gas cylinders in which preferably gases or gas mixtures (subsumed under "gases" hereinbelow) are stored at a pressure of preferably between 50 bar and 500 bar, for example 150 bar, 200 bar or 300 bar, or cryogenic storage containers in which gases are preferably stored at between 1 and 20 bar in cryogenic liquefied form. The gases or gas mixtures are in particular industrial gases, medical gases, gases for food applications or high purity gases, in particular gases which contain oxygen, nitrogen, carbon dioxide or noble gases and/or gas mixtures of a precisely specified composition.

BRIEF DESCRIPTION OF THE DRAWINGS

An exemplary embodiment of the invention will be explained in greater detail with reference to the drawing, in which, in schematic views:

FIG. 1: is a sectional view of a pressurized gas cylinder equipped with a protective device according to the invention, FIG. 2: is a top view of the pressurized gas cylinder of FIG. 1 in viewing direction "II" in FIG. 1, FIG. 3: shows a pressurized gas cylinder having a protective device according to the invention in a different embodiment.

DETAILED DESCRIPTION

Figure 3:
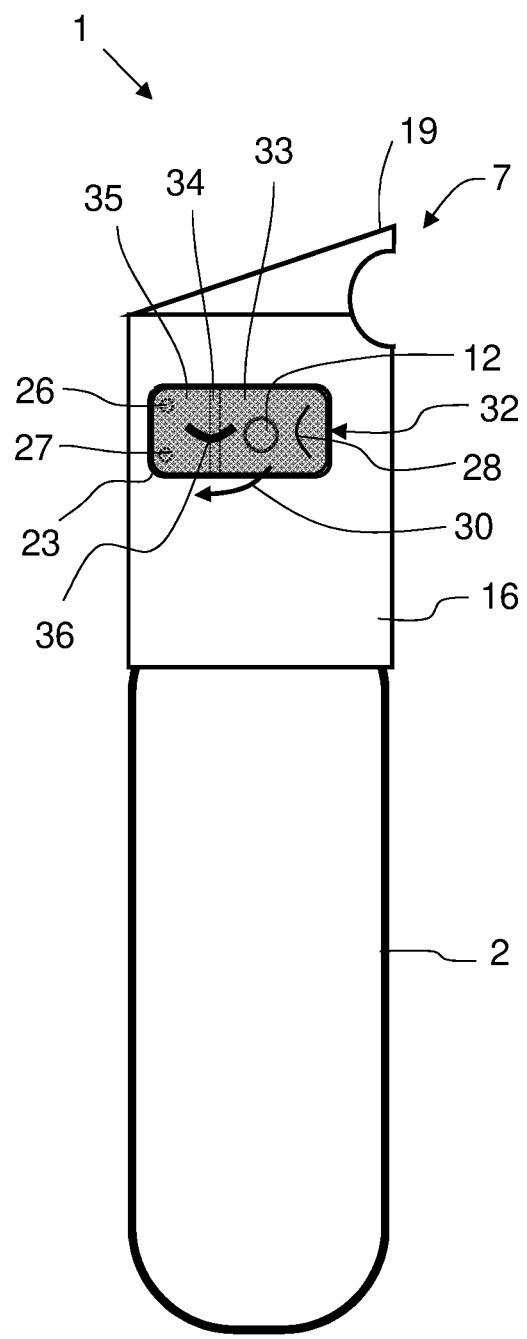

The pressurized gas cylinder 1 shown in the drawings is a container having a capacity of, for example, between 1 liter and 50 liters, which is designed to store a gas under pressure at a filling pressure of, for example, between 50 bar and 300 bar. In particular, it is a container for storing nitrogen, oxygen, carbon dioxide, a noble gas or a gas mixture. In particular, it is a pressurized gas cylinder for storing a medical gas or gas mixture or a gas or gas mixture intended for food applications.

The pressurized gas cylinder 1 comprises, in a conventional manner not explained in greater detail here, a cylinder body 2 which is manufactured, for example, from metal and has a shoulder portion 4 and a neck ring thread 5 which is arranged around an outlet opening, not shown here.

The pressurized gas cylinder 1 is further equipped with a cylinder head 7. The cylinder head comprises an extraction valve 8 fastened to the outlet opening of the pressurized gas cylinder 1, which extraction valve is in particular a standard cylinder valve as is frequently used in commercial pressurized gas cylinders and which complies with all statutory safety requirements. The extraction valve 8 has in a manner known per se a valve stem 9, by means of the rotation of which a gas outlet 10 of the extraction valve 8 is opened and closed.

In addition, the cylinder head 7 has various fittings; in the exemplary embodiment shown here these are a pressure regulator 11 connected to the gas outlet 10 of the extraction valve 8, an extraction connection 12 following the pressure regulator 11, a pressure indicator 13, and a handwheel 14 connected to the valve stem 9. Further fittings, such as, for example, a filling connection, one or more further extraction connections, control or reducing valves or the like, can likewise be provided but are not shown here for reasons of clarity.

The cylinder head 7 is equipped with a protective device which is intended to shield the extraction valve 8 and the fittings 11, 12, 13, 14 from damage in the event of considerable mechanical stress, for example if the pressurized gas cylinder 1 falls over. The protective device comprises a housing 16, which is, for example, a half-shell, basket or cage structure of metal or plastics material which encloses the extraction valve 8. In the exemplary embodiment shown here, the housing 16 is a substantially cylindrical hollow body of plastics material, which is screwed to the neck ring thread 5 of the pressurized gas cylinder 1 by a base plate 17 equipped with an internal thread. In the exemplary embodiment shown here, the housing 16 is additionally equipped with a collar portion 18 with which it is supported by the shoulder portion 4 of the pressurized gas cylinder 1 and which in this manner ensures increased stability of the housing 16 in the event of considerable mechanical stress. The housing 16 is further equipped with a carrying handle 19, which serves to facilitate transportation of the pressurized gas cylinder 1.

In the region of the fittings 12, 13, 14 (and optionally in the region of further fittings not shown here), the housing 16, which is otherwise closed, has access openings which permit access to the fittings 12, 13, 14 even when the housing 16 is mounted on the pressurized gas cylinder 1. In particular, the housing 16 has an access opening 22 in the region of the extraction connection 12. The access opening 22 closely surrounds the extraction connection 12 and is arranged inside a depression 23 of the housing 16, which depression allows an operator to access the extraction connection 12 and connect it to a consumer device (not shown here). In the exemplary embodiment shown here, the depression 23 is cut in a substantially rectangular shape and has a depth of, for example, between 5 mm and 20 mm. The access opening 22 is arranged asymmetrically in the depression 23 and is located inside a half-area of the depression 23 separated by the short central axis of the rectangular depression 23.

The surface of the extraction connection 12 is protected from contaminants from the surroundings by a safety element 25, which will be described in greater detail hereinbelow.

The safety element 25, which is adapted to the area and depth of the depression 23, consists of a resilient, transparent material, such as, for example, an elastomer. If no consumer or no gas line is connected to the extraction connection 12, that is to say in particular during transportation or during a phase in which the pressurized gas cylinder 1 is not in use, the safety element 25 fills the depression 23 completely and also covers the extraction connection 12. The safety element 25 is in this case in its closing position. In a portion of the safety element 25 that is spaced apart from the extraction connection 12 in this closing position, for example in the region of the half-area that does not cover the extraction connection 12, the safety element 25 is fixedly connected to the housing 16 at one or more fixing elements 26, 27, for example interlockingly or by adhesive bonding or clamping. In the half-area of the safety element 25 that covers the extraction connection 12 there is arranged a grip recess 28. In the region between the fixing elements 26, 27 and the extraction connection 12, the safety element 25 has a bending region 29, which is, for example, an area of weakness, at which the resilient safety element 25 can be folded over, as indicated by the arrow 30.

The functioning of the safety element 25 will be described hereinbelow:

As mentioned, in the closing position the safety element 25 fills the depression 23 completely and thereby covers the extraction connection 12, so that the extraction connection is protected against the adhesion of dirt or against contamination.

For the extraction of gas, the safety element 25 is opened by pulling on the grip recess 28. The safety element 25 thereby opens at the bending region 29 in such a manner that the extraction valve 12 is freed and the connection of a consumer device is made possible. The fastening at the fixing elements 26, 27 thereby ensures that the safety element 25 remains connected to the housing 16 and does not slip or fall off. When use of the pressurized gas cylinder 1 is terminated, the consumer device is separated from the extraction connection 12. Owing to the resilient properties of the safety element 25, in particular the return forces inherent in an elastomer, the safety element then automatically returns to the closing position again, in which the extraction connection 12 is covered and secured.

The protective device shown in FIG. 3 differs from that shown in FIGS. 1 and 2 only by the nature of its safety element. Parts that otherwise have the same effect are designated by the same reference numerals as in FIG. 1 and FIG. 2.

The safety element 32 shown in FIG. 3 comprises a safety portion 33 which in its closing position covers the extraction connection 12 and is connected via a hinge or joint 34 to a fastening portion 35 which, as described hereinbefore, is fixedly connected at fixing elements 26, 27 to the housing 16. Safety portion 33 and fastening portion 35 can thereby be manufactured from an inflexible material. The joint 34 is, for example, a film hinge formed in one piece with the two portions 22, 24. For connection of a consumer device, the safety portion 33 is opened at the joint 34 against the force of a return spring 36 extending between the fastening portion 35 and the safety portion 33 and thus pivoted into its freeing position. While the consumer device is connected to the extraction connection 12, the consumer device holds the safety portion 33 in its freeing position. Once the consumer device has been disconnected, the safety portion automatically pivots back into its closing position under the action of the return spring 36.

Furthermore, other configurations instead of the exemplary embodiment shown here are also possible according to the invention. For example, a plurality of extraction connections 12 can be protected by one safety element 25. If the two extraction connections are thereby spaced apart from one another, the safety element can be fastened to the housing in a portion between the extraction connections, and the safety element can be opened towards both extraction connections. Of course, the safety element does not necessarily have to be of rectangular shape within the scope of the invention; rather, it can have any shape and configuration that permits reliable opening from a closing position which covers the extraction connection or the extraction connections into a freeing position which allows a consumer device to be connected and in which, after the consumer device has been removed from the extraction connection, the safety element returns automatically to its closing position.

LIST OF REFERENCE NUMERALS 1 pressurized gas cylinder
2 cylinder body
3 -
4 shoulder portion
5 neck ring thread
6 -
7 cylinder head
8 extraction valve
9 valve stem
10 gas outlet
11 pressure regulator
12 extraction connection
13 pressure indicator
14 -
15 -
16 housing
17 base plate
18 collar portion
19 carrying handle
20 -
21 -
22 access opening
23 depression
24 -
25 safety element
26 fixing element
27 fixing element
28 grip recess
29 bending region
30 arrow
31 -
32 safety element
33 safety portion
34 joint
35 fastening portion
36 return spring

The invention claimed is:

1. A protective device for pressurized gas containers, the protective device comprising:

a housing which can be connected to a pressurized gas container and comprises a cavity for enclosing an extraction valve having at least one extraction connection for the connection of a consumer device and which has one or more access opening(s) allowing access to the at least one extraction connection;

wherein the housing is equipped in a region of the access opening of the at least one extraction connection with a resilient safety element which is fastened to the housing and is in such a form that it can be opened from a closing position, in which the at least one extraction connection is completely covered by the safety element and/or enclosed thereby, into a freeing position, in which the at least one extraction connection is freed for connection of the consumer device, and which, after the consumer device has been removed from the extraction connection, automatically returns to its closing position.

2. The protective device as claimed in claim 1, wherein the safety element is manufactured from a resiliently deformable material.

3. The protective device as claimed in claim 1, wherein the safety element has a safety portion which in its closing position covers or encloses the extraction connection and which is operatively connected to a return mechanism.

4. The protective device as claimed in claim 1, wherein the safety element has a defined bending region.

5. The protective device as claimed in claim 1, wherein the safety element is equipped with a grip element.

6. The protective device as claimed in claim 1, wherein the safety element is manufactured from a transparent material.

7. The protective device as claimed in claim 1, wherein the housing has in the region of the access opening of the extraction connection a depression in which the safety element is received in its closing position.

8. The protective device as claimed in claim 1, wherein the protective device is designed for pressurized gas containers having a capacity of between 1 liter and 50 liters.

9. The protective device as claimed in claim 2, wherein the resiliently deformable material is an elastomer.

* * * * *